United States Patent
Koketsu et al.

(10) Patent No.: US 8,701,411 B2
(45) Date of Patent: Apr. 22, 2014

(54) HEATING MEDIUM SUPPLY SYSTEM, INTEGRATED SOLAR COMBINED CYCLE ELECTRIC POWER GENERATION SYSTEM AND METHOD OF CONTROLLING THESE SYSTEMS

(75) Inventors: Masahiko Koketsu, Kobe (JP); Hideaki Ota, Ibaraki (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 1178 days.

(21) Appl. No.: 12/514,300

(22) PCT Filed: Jan. 9, 2007

(86) PCT No.: PCT/JP2007/050085
§ 371 (c)(1),
(2), (4) Date: Jul. 7, 2009

(87) PCT Pub. No.: WO2007/073008
PCT Pub. Date: Jun. 28, 2007

(65) Prior Publication Data
US 2009/0320828 A1 Dec. 31, 2009

(30) Foreign Application Priority Data

Nov. 10, 2006 (JP) ................................. 2006-304766

(51) Int. Cl.
*F01K 23/10* (2006.01)
(52) U.S. Cl.
USPC ...................................... 60/641.8; 60/39.182
(58) Field of Classification Search
USPC ................ 60/39, 181, 39.182, 641.8–641.15, 60/39.13, 772, 773, 775, 783
See application file for complete search history.

(56) References Cited

U.S. PATENT DOCUMENTS 3,931,806 A * 1/1976 Hayes ........................... 126/587
4,153,104 A * 5/1979 Ruder .......................... 165/48.2

(Continued)

FOREIGN PATENT DOCUMENTS

EP 0526816 2/1993
EP 0784157 A1 7/1997

(Continued)

OTHER PUBLICATIONS

ISA State Intellctual Property Office of the P.R. China, Novelty Search Report of GCC/CN2010/000373, Jun. 15, 2011, 10 pages.

(Continued)

*Primary Examiner* — William H Rodriguez
*Assistant Examiner* — Carlos A Rivera
(74) *Attorney, Agent, or Firm* — Alleman Hall McCoy Russell & Tuttle LLP (57) ABSTRACT

A heating medium supply system is provided which, even when a temperature fluctuation of a heating medium occurs continuously, is capable of relieving a bad thermal influence upon a heat exchanging device due to the temperature fluctuation. The heating medium supply system includes: a heating system configured to heat a liquid heating medium by sunlight; a heat exchanging device configured to heat feedwater; heating medium supply piping for circulating the heating medium; a heating medium temperature detecting device, a heating medium flow rate detecting device and a first heating medium flow control valve; and a control device capable of calculating a value of supply thermal energy from results of detections by the heating medium temperature detecting device and the heating medium flow rate detecting device and controlling an operation of the heating medium flow control valve based on the value of supply thermal energy thus calculated.

8 Claims, 4 Drawing Sheets

(56) References Cited

U.S. PATENT DOCUMENTS

| | | | | |
|---|---|---|---|---|
| 4,171,617 | A | * | 10/1979 | Sakamoto et al. ............ 60/641.8 |
| 4,320,663 | A | * | 3/1982 | Francia ........................... 60/667 |
| 4,438,630 | A | * | 3/1984 | Rowe ............................. 60/676 |
| 4,781,173 | A | * | 11/1988 | Ven et al. ....................... 126/592 |
| 5,444,972 | A | * | 8/1995 | Moore ....................... 60/39.182 |
| 5,806,317 | A | | 9/1998 | Kohler et al. |
| 6,279,312 | B1 | | 8/2001 | Hennecke |
| 6,996,988 | B1 | * | 2/2006 | Bussard ........................ 60/641.8 |
| 8,087,246 | B2 | * | 1/2012 | Ota .............................. 60/641.8 |

FOREIGN PATENT DOCUMENTS

| | | |
|---|---|---|
| JP | 55059884 A | 5/1980 |
| JP | 59-071950 | 4/1984 |
| JP | 61-261678 | 11/1986 |
| JP | 63-183346 | 7/1988 |
| JP | 3063460 A | 3/1991 |
| JP | 2002106976 A | 4/2002 |
| JP | 2004036980 A | 2/2004 |
| JP | 2008-039367 | 2/2008 |
| WO | WO95/25247 | 9/1995 |
| WO | WO97/47866 | 12/1997 |

OTHER PUBLICATIONS

ISA Japanese Patent Office; International Search Report of PCT/JP2007/050085; Jun. 12, 2007; Japan.

* cited by examiner

FIG. 5

HEATING MEDIUM SUPPLY SYSTEM, INTEGRATED SOLAR COMBINED CYCLE ELECTRIC POWER GENERATION SYSTEM AND METHOD OF CONTROLLING THESE SYSTEMS

TECHNICAL FIELD

The present invention relates to a heating medium supply system, an integrated solar combined cycle electric power generation system and a method of controlling a fluid in these systems. More specifically, the present invention relates to: a solar thermal electric power generation system configured to generate electric power by driving a steam turbine with the use of steam generated by means of a heating medium having collected solar thermal energy therein and steam generated by a waste heat recovery boiler; a heating medium supply system for generating steam to be supplied to various steam-using systems including such an electric power generation system; and flow rate controls over the heating medium and steam used in these systems.

BACKGROUND ART

Figure 4:
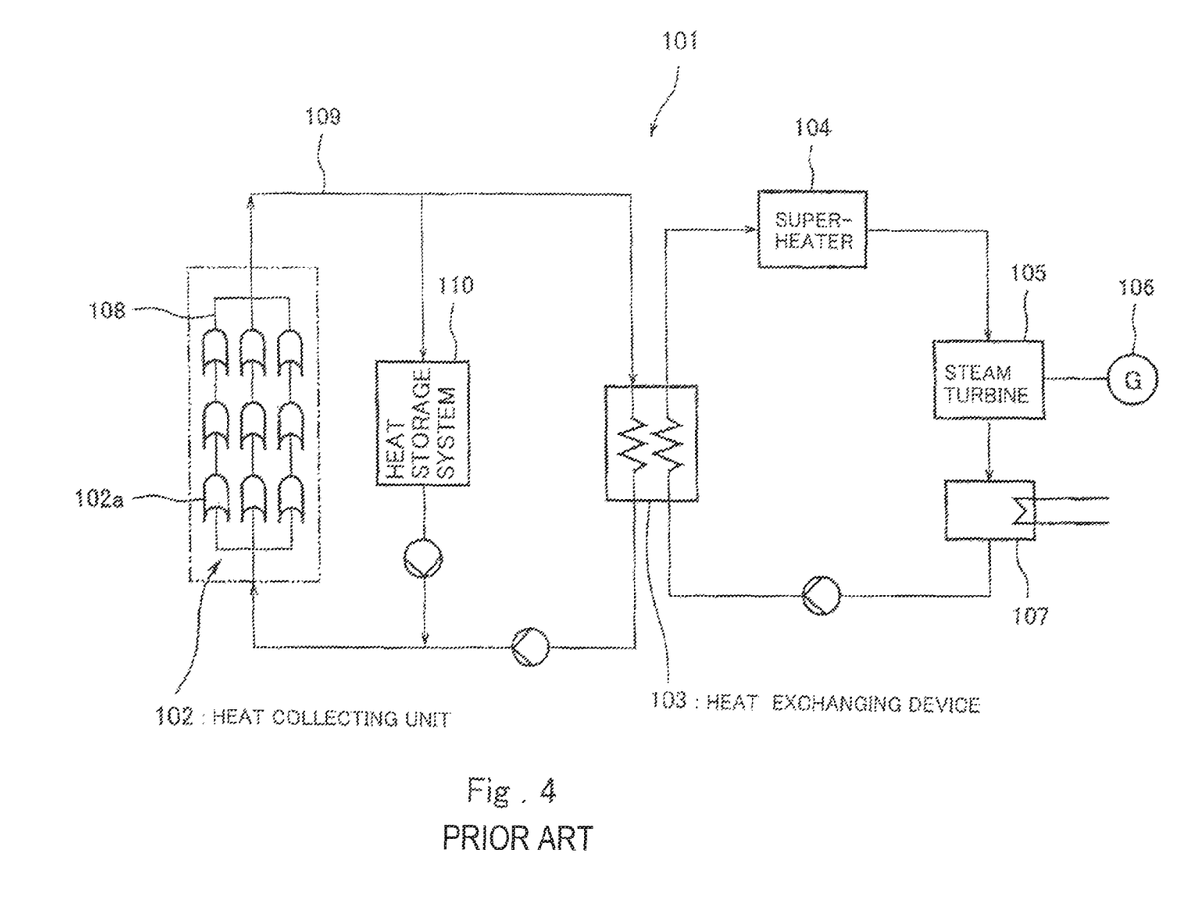
FIG. 4 is a piping diagram schematically illustrating one example of a conventional solar thermal electric power generation system.

A conventional solar thermal electric power generation system 101 shown in FIG. 4 has a configuration wherein: sunlight is collected by means of a concentrating type heat collecting unit (hereinafter will be referred to as "heat collecting unit", simply) 102; a heating medium absorbs collected sunlight as thermal energy; and the heating medium is supplied to a heat exchanging device 103 in order to generate steam by utilizing heat of the heating medium. Saturated steam generated by the heat exchanging device 103 is then superheated by means of a superheater 104. A steam turbine 105 is driven by such superheated steam to generate electric power. In the figure, reference characters 106 and 107 denote an electricity generator and a condenser, respectively.

Methods of collecting incidental solar radiation are roughly classified into the central tower type and the parabolic trough type, the desired one of which is selected in view of various conditions of an installation area and a purpose of use. In many cases, a distribution type of heat collecting unit is employed. The heat collecting unit 102 of the parabolic trough type uses trough-shaped reflectors 102a having a parabolic section in an X-Y plane and configured to reflect sunlight thereon in order to collect it on its focal point. Heat absorbing tubes 108 each extending through the focal points of reflectors 102a along the Z-axis allow a heating medium to pass therethrough in order to collect solar heat. The heat absorbing tubes 108 and heating medium supply piping 109 connected thereto allow the heating medium to circulate between a heat exchanging device and the heat collecting unit. A special oil is generally used as the heating medium. The heating medium absorbs, for example, solar heat to reach a high-temperature condition of about 395° C., releases heat in order to generate steam in the heat exchanging device 103 thereby assuming a low-temperature condition of about 295° C., and returns to the heat collecting unit 102. Reference character 110 denotes a heat storage system.

Figure 5:
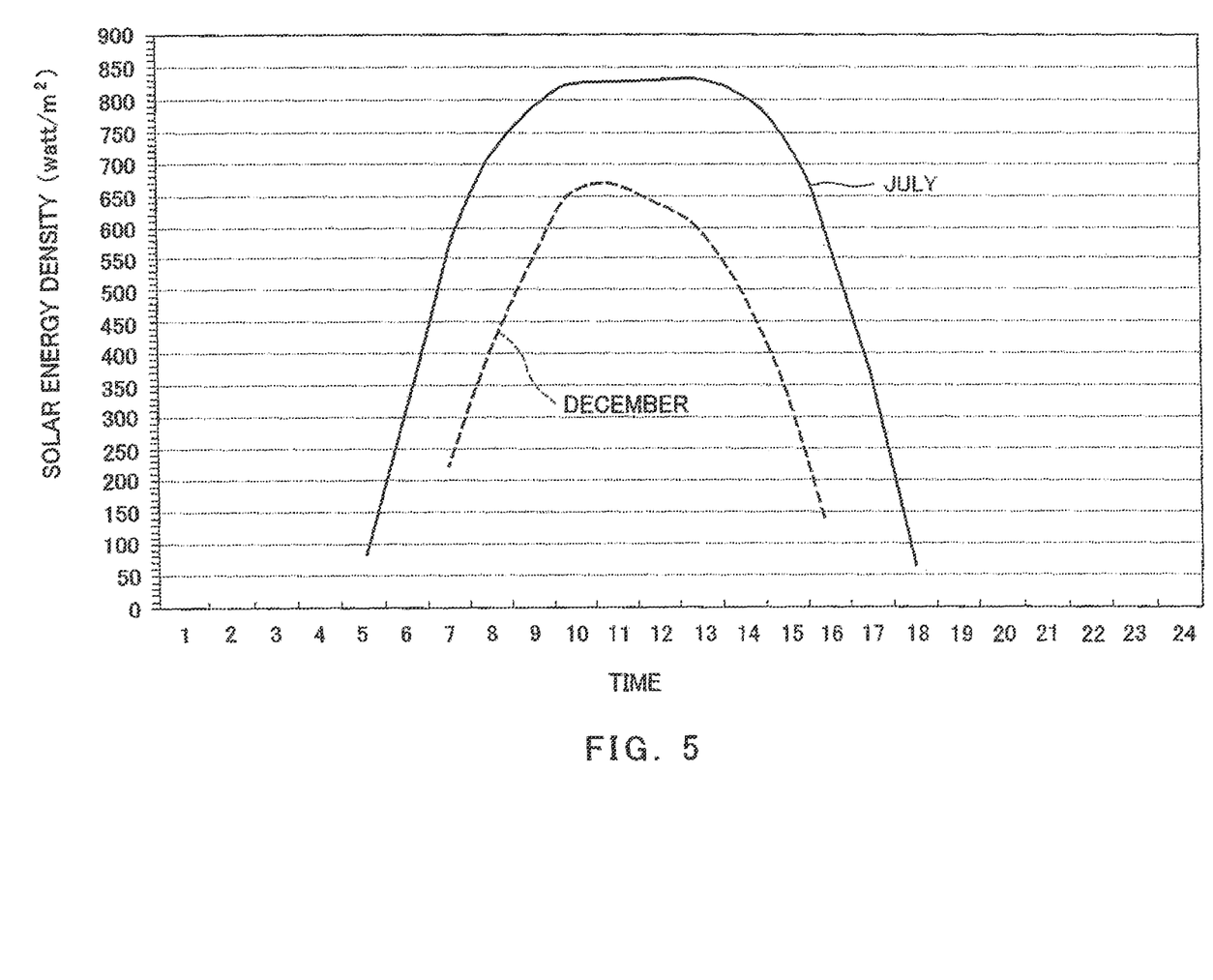
FIG. 5 is a graph plotting one example of solar energy density varying with time during one day.

As can be seen from FIG. 5, a plot of the solar energy density variance during one day, the conventional solar thermal electric power generation system 101 can operate only during day time from sunrise to sunset. For this reason, the operation of the system is stopped at night and must be restarted the next morning. FIG. 5 plots the solar energy density variance during one day at a region in North Africa. Curves plotting average energy densities in July and December are shown respectively in FIG. 5, and curves plotting average energy density variance in other months are considered to fall within the range between the two curves shown. As shown, the intensity of solar thermal energy reaching the heat collecting unit 102 varies from zero to maximum during one day. Therefore, electric power generation cannot continue day and night.

In an attempt to solve this problem, an integrated solar combined cycle electric power generation system has been proposed which combines the above-described steam turbine electric power generation system only relying upon solar heat with the gas turbine combined cycle electric power generation (see European Patent Laid-Open Publications Nos. 0750730 and 0526816, for example). Such a new concept of solar thermal electric power generation system is intended to generate electric power even during nighttime or cloudy days during which solar heat cannot be utilized, by combination of the gas turbine electric power generation with the steam turbine electric power generation by utilizing steam generated in a waste heat recovery boiler. The system thus configured can be expected to continue electric power generation day and night. Such an integrated solar combined cycle electric power generation system includes a heat collecting unit configured to generate saturated steam directly from water and supply it to a steam turbine without using a special heating medium or a heat exchanging device. The electric power generation system according to European Patent Laid-Open Publication No. 0750730 is configured to mix the saturated steam generated in the heat collecting unit with steam generated from a high-pressure turbine for superheating the saturated steam before supplying it to the steam turbine. On the other hand, another kind of the electric power generation system according to European Patent Laid-Open Publication No. 0526816 is configured to mix the saturated steam with the steam generated from a high-pressure turbine and then superheat the saturated steam by means of a reheater of the waste heat recovery boiler before supplying it to the steam turbine.

Irrespective of whether or not the solar thermal electric power generation system is the integrated solar combined cycle electric power generation system, there exists an unavoidable problem. This problem is associated with the condition of solar radiation onto the surface of the Earth incidentally changing and fluctuating (with time) during daytime. In the solar heat collecting unit, heat transfer from solar heat to steam or other heating medium is mostly based on solar radiation conditions. Accordingly, the temperature of steam or other heating medium absorbing solar heat fluctuates in exact response to change in the condition of sunshine onto the surface of the Earth as a natural phenomenon. Since such a fluctuation occurs according to nature, it is difficult to predict accurately the time at which the fluctuation occurs and the degree of the fluctuation. As a result, the heating medium to be supplied to the heat exchanging device 103 in the solar thermal electric power generation system shown in FIG. 4 fluctuates in its condition including its temperature and the like, thus repeatedly imposing thermal stress on the heat exchanging device 103. With the integrated solar combined cycle electric power generation system according to the European Patent Laid-Open Publication No. 0750730, the condition of steam to be supplied to the steam turbine (including its temperature, pressure, wetness and dryness and the like) fluctuates, which may cause various problems with the steam turbine. With the integrated solar combined cycle electric power generation system according to the European Patent Laid-Open Publication No. 0526816, steam to be supplied to the waste heat recovery boiler and the like fluctuates in its condition, which will result in thermal stress repeatedly imposed on the waste heat recovery boiler.

Such a fluctuation in sunshine condition, which is caused by, for example, clouds, sandstorms or a like factor, causes the amount of collected heat to decrease rapidly and largely. Further, when each of the aforementioned reflectors is bent by wind incidentally, sunlight cannot be sufficiently concentrated on the aforementioned heat absorbing tubes. This may also cause a fall of the temperature of the heating medium or the like.

DISCLOSURE OF INVENTION

Problem to be Solved by Invention

The present invention has been made in order to solve the foregoing problems. Accordingly, it is an object of the present invention to provide a heating medium supply system which, even when a temperature fluctuation of a heating medium supplied in, for example, a solar thermal electric power generation system occurs, is capable of relieving an influence upon a heat exchanging device resulting from a steep temperature rise due to such a temperature fluctuation, as well as a method of controlling the flow rate of the heating medium. It is another object of the present invention to provide an integrated solar combined cycle electric power generation system which, even when a fluctuation in the supply flow rate of steam occurs due to a temperature fluctuation of the heating medium, is capable of relieving an influence of such a flow rate fluctuation, as well as a method of controlling the supply flow rate of steam.

Means for Solving Problem

In order to attain the aforementioned objects, the present invention provides a heating medium supply system comprising:
a heating system configured to heat a heating medium by sunlight;
a heat exchanging device configured to heat feedwater by means of the heating medium supplied thereto from the heating system;
a heating medium supply passage for circulating the heating medium to the heating system and to the heat exchanging device;
a first heating medium temperature detecting device, a heating medium flow rate detecting device and a first heating medium flow rate controlling device, which are provided on the heating medium supply passage at respective locations between an outlet of the heating system and an inlet of the heat exchanging device; and
a control device capable of controlling an operation of the first heating medium flow rate controlling device based on results of detections by the first heating medium temperature detecting device and the heating medium flow rate detecting device.

With the heating medium supply system of this arrangement, the control device is capable of calculating the supply of thermal energy from the temperature of the heating medium and the supply flow rate of the heating medium to be supplied to the heat exchanging device. Accordingly, by controlling the operation of the first heating medium flow rate controlling device, it becomes possible to adjust the thermal energy to be supplied to the heat exchanging device to a target value.

The heating medium supply system may further comprise: a bypass passage provided to the heating medium supply passage for circulating the heating medium to the heating system by bypassing the heat exchanging device; a second heating medium flow rate controlling device provided on the bypass passage; and a second heating medium temperature detecting device provided on the heating medium supply passage at a location adjacent an inlet of the heating system. With this arrangement, the second heating medium temperature detecting device can detect the temperature of the heating medium to be returned to the heating system. In accordance with the temperature of the heating medium thus detected, the temperature of the heating medium to be returned to the heating system can be adjusted to an appropriate temperature by mixing with a high-temperature part of the heating medium passing through the bypass passage at the inlet side of the heating system before the heating medium reaches the heating system.

The heat exchanging device may comprise a preheating section for preheating feedwater, an evaporating section for evaporating feedwater preheated, and a superheating section for heating steam generated by the evaporating section to obtain superheated steam, the evaporating section being provided with a pressure detecting device for detecting a pressure of generated steam. This feature makes it possible to determine the temperature of saturated steam within the evaporating section from the saturated steam pressure which is the internal pressure of the evaporating section, hence, it makes it easy to generate superheated steam by supplying the superheating section of the heat exchanging device with the heating medium at a higher temperature than the saturated steam temperature.

An integrated solar combined cycle electric power generation system according to the present invention comprises:
a steam turbine;
a gas turbine;
a waste heat recovery boiler configured to generate steam by utilizing waste heat of the gas turbine and supply steam thus generated to the steam turbine;
a heating medium supply system having a heat exchanging device for generating steam to be supplied to the steam turbine and configured to supply the heat exchanging device with a heating medium for heating water therein by collected solar thermal energy;
a steam supply passage interconnecting the heat exchanging device and a steam pipe of the waste heat recovery boiler for supplying steam to the waste heat recovery boiler;
a steam flow rate detecting device and a first steam flow rate controlling device, which are provided on the steam supply passage; and
a control device capable of controlling a flow rate of steam passing through the steam supply passage by means of the first steam flow rate controlling device based on a result of detection by the steam flow rate detecting device.

The electric power generation system of such an arrangement is capable of effectively controlling the supply flow rate of steam to be supplied to the waste heat recovery boiler even when the amount of steam generated by the heat exchanging device fluctuates due to a temperature fluctuation of the heating medium or the like.

The integrated solar combined cycle electric power generation system may further comprise: a steam pressure detecting device provided on the steam supply passage; a turbine bypass passage branched off from the steam supply passage at a location upstream of the steam pressure detecting device and connected to an outlet side of the steam turbine; and a second steam flow rate controlling device provided on the turbine bypass passage. Such a feature allows the steam pressure detecting device to detect the internal pressure of the steam supply passage. Accordingly, a control of the second steam flow rate controlling device makes it possible to avoid a rise in the internal pressure of the steam supply passage which would otherwise occur, for example, as a result of a control of the flow rate of steam to be supplied to the waste heat recovery boiler by the aforementioned first steam flow rate controlling device.

It is possible that: the aforementioned waste heat recovery boiler comprises a preheating section for preheating feedwater, an evaporating section for evaporating feedwater preheated, and a superheating section for heating steam generated by the evaporating section to obtain superheated steam; and the steam supply passage is connected to the superheating section of the waste heat recovery boiler. With this feature, the degree of superheat of superheated steam generated by the superheating section of the waste heat recovery boiler can be adjusted by means of steam from the heat exchanging device. (Generally, superheated steam generated by the superheating section has a higher degree of superheat than steam generated by the heat exchanging device.) As a result, the waste heat recovery boiler can operate in a condition without undue load in terms of thermal balance.

Preferably, the heating medium supply system of the integrated solar combined cycle electric power generation system comprises any one of the above-described heating medium supply systems.

According to the present invention, there is also provided a method of controlling a flow rate of a heating medium in a heating medium supply system configured to generate steam by supplying thermal energy to feedwater in a heat exchanging device by means of a heating medium having absorbed solar thermal energy in a heating system, the method comprising the steps of:

continuously or intermittently calculating a value of thermal energy to be supplied to the heat exchanging device by the heating medium from a temperature and flow rate of the heating medium to be supplied to the heat exchanging device; and controlling the flow rate of the heating medium to be supplied to the heat exchanging device so that a rate of increase with time in the supply energy does not exceed a predetermined value.

In this heating medium flow rate controlling method, it is possible that:

the heating medium supply system comprises any one of the above-described heating medium supply systems;

in the step of calculating a value of supply thermal energy, the control device continuously or intermittently estimates the value of thermal energy to be supplied to the heat exchanging device by the heating medium based on results of detections by the first heating medium temperature detecting device and the heating medium flow rate detecting device; and in the step of controlling the flow rate of the heating medium, the control device controls an operation of the first heating medium flow rate controlling device so that the rate of increase with time in the supply energy does not exceed a predetermined allowable rate of increase.

The heating medium flow rate controlling method may further comprise the step of estimating a saturation temperature of steam generated by the heat exchanging device, wherein in the step of controlling the flow rate of the heating medium, the heating medium is supplied to the heat exchanging device when the temperature of the heating medium to be supplied to the heat exchanging device becomes higher than a predetermined temperature for starting supply of the heating medium and the flow rate of the heating medium to be supplied to the heat exchanging device is increased to such an extent that the rate of increase with time in the supply energy does not exceed the predetermined value as the temperature of the heating medium rises.

In the heating medium flow rate controlling method, it is possible that:

the heating medium supply system has the heat exchanging device comprising a preheating section, an evaporating section and a superheating section as described above;

in the step of estimating a saturation temperature of steam, the control device estimates the saturation temperature of steam within the evaporating section from a steam pressure as a result of detection by the pressure detecting device provided in the evaporating section of the heat exchanging device;

in the step of controlling the flow rate of the heating medium, the temperature of the heating medium is detected by the first heating medium temperature detecting device and the temperature for starting the supply of the heating medium is the sum of the saturation temperature of steam and a predetermined excess temperature; and the control device controls the operation of the first heating medium flow rate controlling device so as to start supplying the heating medium to the heat exchanging device and increase the flow rate of the heating medium.

In the heating medium flow rate controlling method, it is possible that:

the heating medium supply system has the bypass passage for circulating the heating medium to the heating system by bypassing the heat exchanging device as described above; and the control device controls the second heating medium flow rate controlling device in such a manner as to cause at least a part of the heating medium outgoing from the heating system to pass through the bypass passage and join with the heating medium to be returned to the heating system so that the temperature of the heating medium to be returned to the heating system as a result of detection by the second heating medium temperature detecting device does not fall below a predetermined temperature.

The present invention also provides a method of controlling a flow rate of steam in any one of the integrated solar combined cycle electric power generation systems described above, the method comprising the steps of:

continuously or intermittently detecting a flow rate of steam to be supplied from the heat exchanging device to the waste heat recovery boiler; and controlling the flow rate of steam to be supplied from the heat exchanging device to the waste heat recovery boiler so that a rate of increase with time in the supply flow rate of steam does not exceed a predetermined value.

In the method of controlling a flow rate of steam, it is possible that:

the integrated solar combined cycle electric power generation system has the turbine bypass passage described above; and the control device controls an operation of the second steam flow rate controlling device so that a steam pressure detected by the steam pressure detecting device does not exceed a predetermined value.

Any one of the above-described heating medium flow rate controlling methods may be combined with any one of the above-described steam flow rate controlling methods.

Advantage of Invention

According to the present invention, even when a heating medium to be supplied to a heat exchanging device fluctuates in its temperature in such a system as a solar thermal electric power generation system, it is possible to relieve a thermal influence upon the heat exchanging device resulting from a steep temperature rise due to such a temperature fluctuation. Also, even when the supply flow rate of steam fluctuates due to a temperature fluctuation of the heating medium, it is possible to relieve an influence of such a flow rate fluctuation upon a waste heat recovery boiler of an integrated solar combined cycle electric power generation system.

The foregoing and other features of the present invention will be apparent from the following detailed description with reference to the drawings.

BEST MODE FOR CARRYING OUT THE INVENTION

Embodiments of an integrated solar combined cycle electric power generation system, a heating medium supply system, a heating medium flow rate controlling method and a steam flow rate controlling method according to the present invention will be described with reference to the attached drawings.

Figure 1:
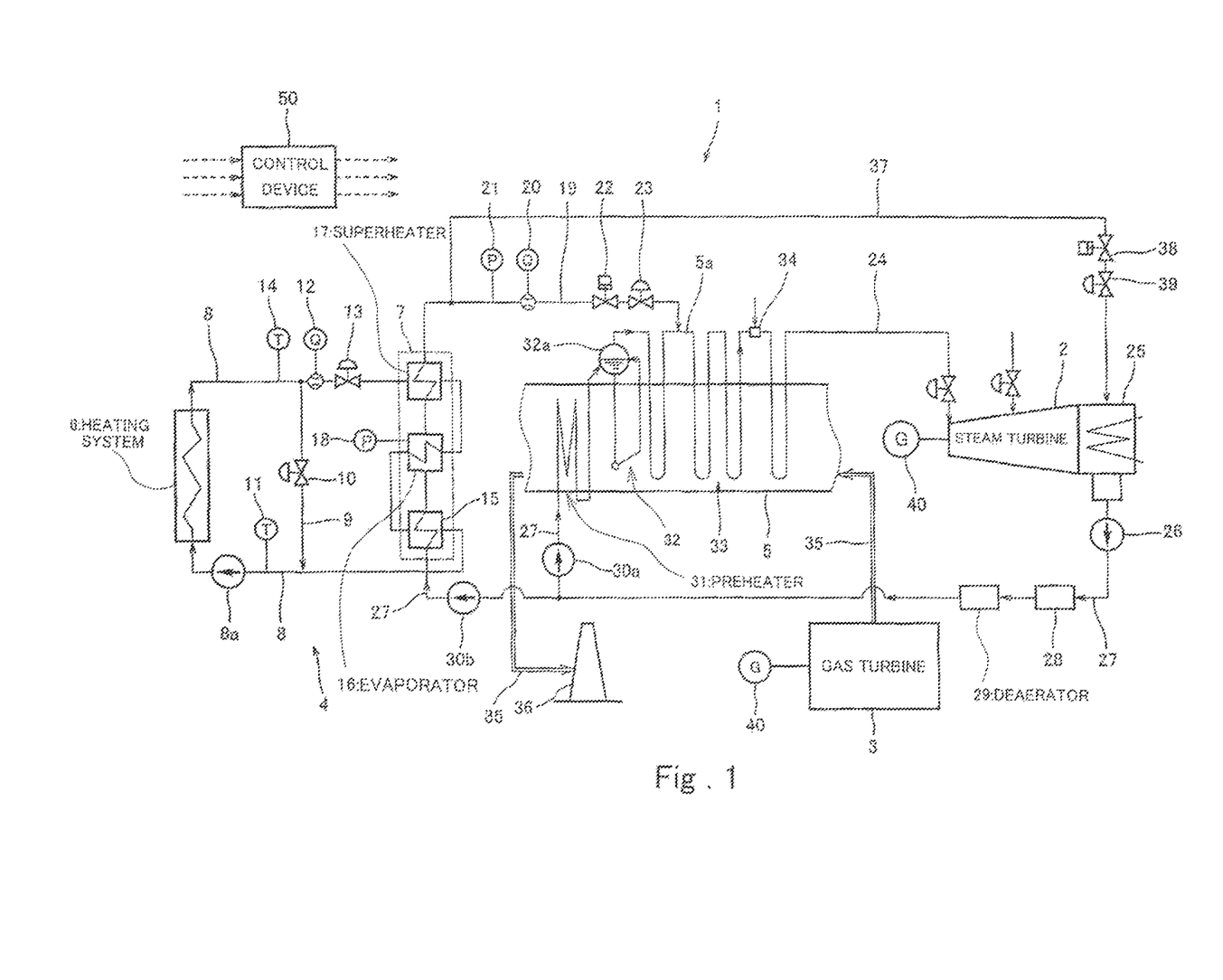
FIG. 1 is a piping diagram schematically illustrating an integrated solar combined cycle electric power generation system as one embodiment of the present invention.

FIG. 1 illustrates an integrated solar combined cycle electric power generation system 1 in which a gas turbine electric power generation system using a gas turbine 3 driven by combusting any one of various gas or liquid fuels such as natural gas and a steam turbine electric power generation system using a steam turbine 2 driven by steam generated from solar heat as well as waste heat of the gas turbine 3 are combined together. The steam turbine 2 and the gas turbine 3 are coupled to respective electricity generators 40. In the electric power generation system 1, steam to be supplied to the steam turbine 2 is generated by a heat exchanging device 7 included in a system 4 configured to supply a liquid heating medium having collected solar heat therein (hereinafter will be referred to as "heating medium supply system") and by a waste heat recovery boiler 5 utilizing waste heat of the gas turbine 3. The electric power generation system 1 is provided with a control device 50 for appropriately controlling the supply flow rate of the heating medium and the supply flow rate of steam. These flow rate controls will be described later. The heating medium is not limited to a liquid heating medium.

The aforementioned heating medium supply system 4 includes a heating system 6 for collecting solar thermal energy in the heating medium, the aforementioned heat exchanging device 7 for generating steam by allowing the heating medium thus heated to heat feedwater, and heating medium supply piping 8 for circulating the heating medium to the heating system 6 and to the heat exchanging device 7. The heat exchanging device 7 employed herein is of the counter flow type using the heating medium and feedwater. The heating system 6 includes a heat collecting unit which may comprise reflectors of the parabolic trough type and a heat absorbing tube extending through the focal points of the reflectors, like a conventional heat collecting unit. In this case, the inlet and the outlet of the heat absorbing tube are connected to the aforementioned heating medium supply piping 8.

The heating medium supply piping 8 is provided with bypass piping 9 which is connected thereto in such a manner as to allow a stream of the heating medium to bypass the heat exchanging device 7 and circulate to the heating system 6 only. The bypass piping 9 is provided with a flow control valve 10 as a second heating medium flow rate controlling device. A portion of the heating medium supply piping 8 that extends between the joint with the outlet of the bypass piping 9 and the inlet of the heating system 6 is provided with a circulating pump 8a and a temperature detecting device 11 as a second heating medium temperature detecting device. The aforementioned control device 50 controls opening/closing of the flow control valve 10 based on a result of detection by the temperature detecting device 11 in such a manner as to cause an appropriate amount of a high-temperature part of the heating medium to pass through the bypass piping 9 and join with another part of the heating medium to be returned to the heating system 6. This control makes it possible to raise the temperature of the heating medium, which has lowered by dissipation of heat in the heat exchanging device 7, up to a target temperature before returning the heating medium to the heating system 6.

A portion of the heating medium supply piping 8 that extends between the joint with the inlet of the bypass piping 9 and the inlet of the heat exchanging device 7 is provided with a flow rate detecting device 12 and a flow control valve 13 as a first heating medium flow rate controlling device, while a portion of the heating medium supply piping 8 that extends between the outlet of the heating system 6 and the inlet of the heat exchanging device 7 is provided with a temperature detecting device 14 as a first heating medium temperature detecting device. The control device 50 is capable of calculating a value of thermal energy to be carried in the heat exchanging device 7 by the heating medium from results of detections by the flow rate detecting device 12 and the temperature detecting device 14. Also, the control device 50 is capable of controlling opening/closing of the flow control valve 13 so as to suppress a steep fluctuation in the thermal energy while monitoring increase and decrease in the thermal energy to be carried in the heat exchanging device 7.

The heat exchanging device 7 comprises a preheating section (economizer) 15 for preheating feedwater, an evaporating section (evaporator) 16 for evaporating feedwater preheated, and a superheating section (superheater) 17 for superheating steam generated by the evaporating section 16, which are arranged along water supply piping 27. The evaporating section 16 is provided with a pressure detecting device 18 for detecting the pressure of steam generated. The control device 50 is capable of calculating a saturated steam temperature from a saturated steam pressure within the evaporating section 16 detected by the pressure detecting device 18. Also, the control device 50 is capable of controlling the opening/closing operation of the flow control valve 13 while comparing the temperature of saturated steam within the heat exchanging device 7 with the temperature of the heating medium. For example, such a control is also performed to bring steam generated by the heat exchanging device 7 into a superheated condition. Since the heat exchanging device 7 has the superheating section 17, such a control makes it possible to supply to the superheating section 17 of the heat exchanging device 7 with the heating medium having a temperature higher than the saturated steam temperature within the heat exchanging device 7 (for example, a value of temperature obtained by addition of a predetermined excess temperature, for example, about 20° C. to the saturated steam temperature or obtained by multiplication of the saturated steam temperature by a predetermined factor, for example, 107%). By supply of such a heating medium, saturated steam generated by the heat exchanging device 7 is superheated into dry steam within a range of approximately 25±15° C.

The steam outlet of the heat exchanging device 7 and a steam pipe 5a of the aforementioned waste heat recovery boiler 5 are interconnected through steam supply piping 19. The steam supply piping 19 is provided with a steam flow rate detecting device 20, a steam pressure detecting device 21, a shut-off valve 22, and a steam flow control valve 23 as a first steam flow rate controlling device. The control device 50 is capable of increasing and decreasing the supply amount of steam or adjusting the rate of change of the steam flow rate by controlling the valve opening of the steam flow control valve 23 while monitoring the flow rate of steam to be supplied from the heat exchanging device 7 to the waste heat recovery boiler 5.

The waste heat recovery boiler 5 and the steam turbine 2 are interconnected through a common steam supply pipe 24. Steam generated by the waste heat recovery boiler 5 and steam generated by the heat exchanging device are joined together and the mixed steam is supplied to the steam turbine 2. Steam having driven the steam turbine 2 is condensed into water by a condenser 25 and the water is fed through water supply piping 27 with a pressure by means of a water supply pump 26. The water is firstly heated by a feedwater heater 28 and then deaerated by a deaerator 29. Subsequently, the water is passed through branched lines to the waste heat recovery boiler 5 as well as to the heat exchanging device 7 by means of respective pumps 30a and 30b. The ratio of the flow rate of feedwater to be supplied to the waste heat recovery boiler 5 and to the heat exchanging device 7 is controlled in accordance with actual electricity demands and solar heat, being based on the amount of steam determined at a construction planning stage. Since the heating medium supply system 4 stops operating during the time period from sunset to sunrise (during the nighttime), water supply to the heat exchanging device 7 is also stopped accordingly.

An exemplary basic construction of the waste heat recovery boiler 5 comprises a preheater (economizer) 31, an evaporator 32 having a steam drum 32a, and a superheater 33, which are arranged along the steam pipe 5a of the boiler 5. The superheating section 33 comprises plural stages (four stages according to the present embodiment). Specifically, plural heat exchanging stages for recovering heat of exhaust gas from the gas turbine 3 are formed and connected in series. Of course, the number of such stages is not limited to four, but may be not more than three or not less than five in accordance with the ratio between the calorie supplied by steam from the heat exchanging device 7 and the calorie supplied by exhaust gas from the gas turbine 3 or a like factor.

Steam generated by the heat exchanging device 7 is in a superheated condition. For such superheated steam to be supplied to the superheating section 33 of the waste heat recovery boiler 5, the aforementioned steam supply piping 19 interconnects the steam outlet of the heat exchanging device 7 and a portion of the superheating section 33 that is located intermediate the first stage and the second stage. Superheated steam supplied from the heat exchanging device 7 to the superheating section 33 through the steam supply piping 19 is mixed with steam generated by the evaporating section 32 of the waste heat recovery boiler 5 in the superheating section 33. By supplying steam from the heat exchanging device 7 to the portion between the first and second stages of the superheating section 33, it becomes possible that the waste heat recovery boiler 5 operates in a desirable condition in terms of thermal balance. The superheating section 33 is provided (at a portion thereof located intermediate the third and fourth stages according to the present embodiment) with a desuperheater 34 for keeping the steam temperature within an allowable maximum temperature.

While the intermediate portion of the first and second stages of the four-stage superheating section 33 is illustrated as the joint between the steam supply piping 19 and the superheating section 33, there is no limitation to such a feature. Change in the location of the joint may be desirable if the number of stages of the superheating section 33 changes. It is also possible that the steam supply piping 19 is branched at a location downstream of the steam flow control valve 23 and connected to an intermediate portion of the third and fourth stages as well as the intermediate portion of the first and second stages. Further, it is possible that each intermediate portion between adjacent stages is connected to the corresponding one of branch pipes of the steam supply piping 19 to provide switchable supply destinations, any suitable one of which is selected in accordance with the steam temperature within the superheating section 33. Also, the location of the desuperheater 34 is not limited to the portion intermediate the third and fourth stages of the superheating section 33.

The superheating section 33 is designed and manufactured to have the capability (heating area) of heating the total amount of superheated steam from the heat exchanging device 7 and saturated steam from the evaporating section 32 to a predetermined superheat temperature, so that the waste heat recovery boiler 5 is capable of supplying the steam turbine 2 with superheated steam having stabilized properties. Exhaust gas supplied from the gas turbine 3 to the waste heat recovery boiler 5 through exhaust gas piping 35 is used to heat feedwater for generation of steam and then emitted into the atmosphere from a stack 36 through the exhaust gas piping 35.

The subject electric power generation system 1 is configured to allow at least a part of steam generated by the heat exchanging device 7 to bypass to the outlet side of the steam turbine 2. Specifically, turbine bypass piping 37 is branched off from the steam supply piping 19 at a location adjacent the joint with the outlet of the heat exchanging device 7 and connected to the aforementioned condenser 25 by bypassing the waste heat recovery boiler 5 and the steam turbine 2. The turbine bypass piping 37 is provided with a shut-off valve 38 and a steam flow control valve 39 as a second steam flow rate controlling device. The control device 50 is capable of controlling the valve opening of the steam flow control valve 23 of the turbine bypass piping 37 based on a result of detection by the steam pressure detecting device 21 of the steam supply piping 19, thereby stabilizing the pressure of steam to be supplied to the steam turbine 2.

The following description is directed to a method of controlling a heating medium flow rate to relieve an influence upon the aforementioned heat exchanging device resulting from a temperature fluctuation of the heating medium due to a variation in the sunshine condition or a like factor, as well as a method of controlling a supply flow rate of steam to relieve an influence upon the aforementioned waste heat recovery boiler resulting from a fluctuation in the supply flow rate of steam due to a temperature fluctuation of the heating medium or a like factor.

When the heating medium supply system 4 having been stopped from sunset starts operating again after sunrise, the heating medium is supplied to the heat exchanging device 7. At that time, the heating medium is at a significantly lowered temperature, while the pressure and temperature of steam remaining within the evaporating section 16 of the heat exchanging device 7 treated for heat insulation are not substantially lowered. For saturated steam remaining within the evaporating section 16 to be superheated by the heating medium in the superheating section 17, the temperature of the heating medium to be supplied is desirably set higher by a predetermined value than the temperature of saturated steam. For this purpose, the flow control valves 13 and 10 are controlled to supply the heating medium to the heat exchanging device after the temperature of the heating medium has been raised to a predetermined temperature (which is higher than the aforementioned saturated steam temperature) in order to allow the heat exchanging device 7 to perform efficient steam generation by solar heat. A specific example of such a control will be described below.

Figure 2:
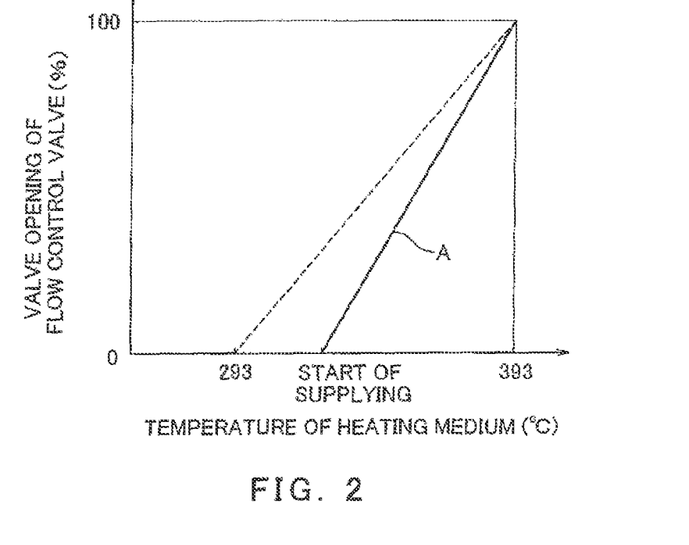
FIG. 2 is a graph plotting the relationship between the temperature for starting the supply of a heating medium to be supplied to a heat exchanging device and the valve opening operation of a flow control valve in the integrated solar combined cycle electric power generation system shown in FIG. 1.

The control device 50 calculates the saturated steam temperature (310° C., for example) from the saturated steam pressure (100 bar, for example) within the evaporating section 16 detected by the pressure detecting device 18 in the evaporating section 16. When the temperature of the heating medium according to detection by the temperature detecting device 14 on the heating medium supply piping 8 reaches the temperature for starting the supply (310+20=330° C.) which is higher by the predetermined excess temperature (20° C., for example) than the saturated steam temperature (310° C.), the flow control valve 13 which has been closed until then begins opening. With closing the flow control valve 13 and opening the flow control valve 10 respectively until the temperature of the heating medium reaches 330° C., the heating medium is allowed to circulate to the heating system 6 by bypassing the heat exchanging device 7 in order to absorb solar thermal energy. The process of this control is illustrated in FIG. 2. In this graph, the abscissa represents the temperature of the heating medium and the ordinate represents the valve opening of the flow control valve 13. It is needless to say that supply of the heating medium may start when the temperature of the heating medium becomes higher than the temperature for starting the supply of the heating medium. With the control thus performed, steam supplied from the heat exchanging device 7 must always be in a dry steam condition.

There is no limitation to these values of temperature and pressure which are illustrative. While the temperature for starting the supply of the heating medium is a value obtained by addition of the predetermined excess temperature to the saturated steam temperature according to this example, there is no limitation to this method of calculation. For example, the temperature for starting the supply may be a value of temperature obtained by multiplication of the saturated steam temperature by a predetermined factor (107%, for example). Alternatively, an allowable minimum temperature at which the heating medium can be supplied to the heat exchanging device 7 is set substantially equal to the temperature of the heating medium to be returned to the heating system 6 (293° C., for example).

In the operation of opening the flow control valve 13 after the temperature of the heating medium has reached the temperature for starting the supply, on the precondition that the flow control valve 13 becomes fully open when the temperature of the heating medium reaches a designed maximum temperature (393° C., for example), the valve opening may be increased with (for example, as a linear function of) a rise in the heating medium temperature up to the designed maximum temperature. That is, the valve opening of the flow control valve 13 increases along an inclining straight line A in FIG. 2.

In parallel with the valve opening operation, the valve opening of the flow control valve 10 of the bypass piping 9 may be decreased toward the closed position. By thus supplying the heating medium after the temperature thereof has reached the predetermined temperature, it is possible to prevent the thermal energy of saturated steam remaining within the heat exchanging device 7 from being lost. Further, gradual opening of the flow control valve 13 makes it possible to relieve thermal shock to the heat exchanging device 7, thereby allowing the heat exchanging device 7 to operate stably.

Another control of the supply flow rate of the heating medium to be supplied to the heat exchanging device 7 may be performed instead of or in combination with the above-described control. During starting operation of the heating medium supply system 4, the heating medium is circulated to the heating system 6 in order to raise its temperature. In this phase, for example, a control is performed so that the rate of increase in the thermal energy to be carried in the heat exchanging device 7 by means of the heating medium does not exceed a predetermined value. Specifically, the control device 50 continuously calculates a value of thermal energy to be carried in the heat exchanging device 7 by the heating medium from results of continuous detections by respective of the flow rate detecting device 12 and the temperature detecting device 14 which are provided on the heating medium supply piping 8. Subsequently, opening/closing of the flow control valve 13 is controlled so that the rate of increase with time in the thermal energy input thus obtained does not exceed a predetermined allowable maximum rate of increase in the thermal energy input as plotted in the graph of FIG. 3. That is, the valve opening is controlled so that the curve plotting an increase in the actual input of thermal energy is inclined more gently than an inclining straight line B shown in FIG. 3. In this graph, the abscissa represents elapsed time and the ordinate represents the value of thermal energy carried in the heat exchanging device 7. By thus limiting the rate of increase in the thermal energy to be carried in the heat exchanging device 7, it is possible to reduce thermal shock to the heat exchanging device 7, hence, allowing the heat exchanging device 7 to operate stably.

Figure 3:
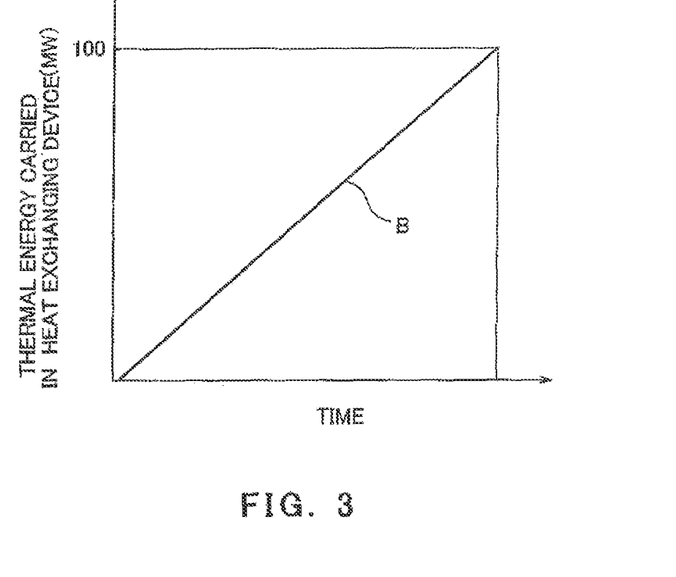
FIG. 3 is a graph plotting an allowable maximum rate of increase in thermal energy to be carried in the heat exchanging device by the heating medium in the integrated solar combined cycle electric power generation system shown in FIG. 1.

The following description is directed to a combined control comprising the control of the supply flow rate of the heating medium illustrated in FIG. 2 and the control of the rate of increase in the thermal energy input illustrated in FIG. 3, with the latter (FIG. 3) given a higher priority. As described above, as the heating medium starts being supplied to the heat exchanging device 7 after the temperature for starting the supply has been reached, the valve is opened so as to increase the valve opening along the straight line A plotting the allowable maximum valve opening shown in FIG. 2 or a straight line plotting the valve opening which has an inclination angle not more than the inclination angle of the straight line A according to the principle. With such a valve opening speed, the increase rate of the thermal energy input may exceed the allowable maximum increase rate shown in FIG. 3. In such a case, in considering preferentially the allowable maximum increase rate, the valve opening of the flow control valve 13 is so controlled that the increase rate of the thermal energy input does not exceed the allowable maximum increase rate. On the other hand, in cases where the increase rate of the thermal energy input does not exceed the allowable maximum increase rate under the control of the valve opening along the allowable maximum valve opening line A shown in FIG. 2, the control of the valve opening along the allowable maximum valve opening line A is maintained.

The above-described control of the flow rate of the heating medium to be supplied to the heat exchanging device 7 is not limited to a starting phase of operation of the heating medium supply system 4. For example, the above-described control is applicable to cases where the temperature of the heating medium rises due to fluctuations in the sunshine condition during daytime.

Description will be made of a control performed to prevent the temperature of the heating medium from becoming lower than at least an allowable minimum temperature in order to keep as constant as possible the temperature of the heating medium to be returned to the heating system 6 after dissipation of its thermal energy in the heat exchanging device 7. The intensity of solar thermal energy in accordance with nature cannot be controlled as desired. For this reason, if the temperature of the heating medium to be returned to the heating system 6 is relatively low, the temperature of the heating medium outgoing from the heating system 6 toward the heat exchanging device 7 is relatively low accordingly. To suppress such a large temperature fluctuation of the heating medium, such a control as described below is performed.

The control device 50 monitors a result of detection by the temperature detecting device 11 provided on the heating medium supply piping 8 on the inlet side of the heating system 6. When the detected temperature is determined as being lower than a predetermined reference temperature (which is higher than the allowable minimum temperature) by comparing the detected temperature with the reference temperature, the control device 50 causes the flow control valve 10 of the bypass piping 9 to increase its valve opening, to pass an appropriate amount of a high-temperature part of the heating medium through the bypass piping 9, and to add it to the heating medium to be returned to the heating system 6. Such a control is performed so that the temperature of the heating medium to be returned to the heating system 6 does not fall below the allowable minimum temperature, which is lower than the reference temperature.

The controls of the temperature and flow rate of the heating medium thus described can obviate a bad thermal influence upon the heat exchanging device 7 as well as a bad influence on the amount of steam generation.

The following description is directed to a method of controlling the supply flow rate of steam for obviating a bad influence upon the waste heat recovery boiler 5 resulting from an occurrence of a fluctuation in the amount of steam generated by the heat exchanging device 7. For example, in supplying steam from the heat exchanging device 7 to the waste heat recovery boiler 5 even under the aforementioned various controls with respect to the heating medium, it is conceivable that the rate of increase in the steam supply flow rate exceeds an allowable maximum rate of increase in the steam supply flow rate that is predetermined for the waste heat recovery boiler 5. Such an event is detected by the aforementioned steam flow rate detecting device 20. The control device 50 controls the opening/closing operation of the steam flow control valve 23 so as to prevent the rate of increase in the steam supply flow rate from exceeding the aforementioned allowable maximum rate of increase in the steam supply flow rate while continuously receiving detection signals from the steam flow rate detecting device 20. Alternatively, it is possible that: a reference increase rate which is lower than the allowable maximum increase rate is previously established; a result of detection by the steam flow rate detecting device 20 is compared with the reference increase rate; and the opening/closing operation of the steam flow control valve 23 is controlled so as to eliminate a deviation of the result of detection from the reference increase rate.

Since a decrease in the valve opening of the steam flow control valve 23 results in a rise in the internal pressure of piping located upstream of the valve 23, the control device 50 also controls the valve opening of the steam flow control valve 23 of the turbine bypass piping 37 so that a pressure detected by the steam pressure detecting device 21 of the steam supply piping 19 does not exceed an allowable pressure value, in parallel with the control of the steam flow control valve 23. Alternatively, it is possible that: a reference pressure value which is lower than the allowable pressure value is previously established; a result of detection by the steam flow rate detecting device 20 is compared with the reference pressure value; and the opening/closing operation of the steam flow control valve 23 is controlled so as to eliminate a deviation of the result of detection from the reference pressure value.

The above-described controls over the supply start and supply flow rate of the heating medium to be supplied to the heat exchanging device 7 and the supply flow rate of steam to be supplied to the waste heat recovery boiler 7 are performed in harmony with each other.

While the foregoing embodiments are each directed to an integrated solar combined cycle electric power generation system 1 using the gas turbine 3 and the steam turbine 2, the heating medium supply system 4 is also applicable to steam turbine electric power generation not using any gas turbine in combination, without any particular limitation to an integrated solar combined cycle electric power generation system using a gas turbine in combination. Besides these electric power generation systems, the heating medium supply system is applicable to any system which cannot avoid the temperature fluctuation of the heating medium.

The heating system 6 for the heating medium may employ a heat collecting unit comprising reflectors of any other type than the parabolic trough type or a heat collecting unit of the so-called central tower type, to say nothing of a heat collecting unit comprising reflectors of the aforementioned parabolic trough type.

It should be noted that the present invention is not limited to the foregoing embodiments which are only illustrative and may be variously modified without departing from the concept of the present invention.

It will be apparent from the foregoing description that various modifications and embodiments of the present invention may occur to those skilled in the art. Therefore, the foregoing description should be construed as being based on the attached drawings and is provided for the purpose of teaching those skilled in the art to become capable of carrying out the present invention. The details of the structures and functions described above can be modified substantially without departing from the spirit of the present invention. Accordingly, such modifications and changes should be construed as being included within the scope of the present invention.

Industrial Applicability

According to the present invention, it is possible to relieve a thermal influence upon a heat exchanging device even when a heating medium is supplied to the heat exchanging device while fluctuating in its temperature in such a system as a solar thermal electric power generation system. Therefore, the present invention is useful for a heating medium supply system having a heat exchanging device using a heating medium of which temperature fluctuation is unavoidable and for an electric power generation system including such a heating medium supply system.

The invention claimed is:

1. A heating medium supply system for a combined cycle gas turbine plant comprising:
   a heating system configured to heat a heating medium by sunlight;
   a heat exchanging device for generating steam to be supplied to a steam turbine of the combined cycle gas turbine plant, wherein said heat exchanging device is configured to heat feedwater using the heating medium supplied thereto from said heating system;
   a heating medium supply passage extending from an outlet of said heating system to an inlet of said heat exchanging device for circulating the heating medium to said heating system and to said heat exchanging device;
   a first heating medium temperature detecting device, a heating medium flow rate detecting device and a first heating medium flow rate controlling valve, which are provided on said heating medium supply passage at respective locations between said outlet and said inlet; and
   a control device configured to control the flow rate of the heating medium led from said heating system to said heat exchanging device by controlling said first heating medium flow rate controlling valve based on results of detections by said first heating medium temperature detecting device and said heating medium flow rate detecting device.

2. The heating medium supply system according to claim 1, further comprising:
   a bypass passage provided to said heating medium supply passage for circulating the heating medium to said heating system by bypassing said heat exchanging device;
   a second heating medium flow rate controlling device provided on said bypass passage; and
   a second heating medium temperature detecting device provided on said heating medium supply passage at a location adjacent an inlet of said heating system.

3. The heating medium supply system according to claim 1, wherein said heat exchanging device comprises a preheating section for preheating feedwater, an evaporating section for evaporating feedwater preheated, and a superheating section for heating steam generated by said evaporating section to obtain superheated steam, the evaporating section being provided with a pressure detecting device for detecting a pressure of generated steam.

4. A method of controlling a flow rate of a heating medium in a heating medium supply system configured to generate steam by supplying thermal energy to feedwater in a heat exchanging device using a heating medium having absorbed solar thermal energy in a heating system, the method comprising the steps of:
   continuously or intermittently calculating a value of thermal energy to be supplied to said heat exchanging device by the heating medium from a temperature and flow rate of the heating medium to be supplied to said heat exchanging device; and
   controlling the flow rate of the heating medium led from said heating system to said heat exchanging device, wherein said heating medium supply system comprises a heating medium supply system including the heating system configured to heat the heating medium by sunlight, the heat exchanging device for generating steam to be supplied to a steam turbine of a combined cycle gas turbine plant, said heat exchanging device configured to heat feedwater using the heating medium supplied thereto from said heating system, a heating medium supply passage extending from an outlet of said heating system to an inlet of said heat exchanging device for circulating the heating medium to said heating system and to said heat exchanging device, a first heating medium temperature detecting device, a heating medium flow rate detecting device and a first heating medium flow rate controlling device, which are provided on said heating medium supply passage at respective locations between said outlet and said inlet of said heat exchanging device, and a control device capable of controlling an operation of said first heating medium flow rate controlling device based on results of detections by said first heating medium temperature detecting device and said heating medium flow rate detecting device.

5. The method according to claim 4, wherein:
   in the step of calculating a value of thermal energy to be supplied, said control device continuously or intermittently estimates the value of thermal energy to be supplied to said heat exchanging device by the heating medium based on results of detections by said first heating medium temperature detecting device and said heating medium flow rate detecting device; and
   in the step of controlling the flow rate of the heating medium, said control device controls an operation of said first heating medium flow rate controlling device so that the rate of increase with time in the supply energy does not exceed the predetermined value.

6. The method according to claim 5, further comprising a step of estimating a saturation temperature of steam generated by said heat exchanging device, wherein
   in the step of controlling the flow rate of the heating medium, the heating medium is supplied to said heat exchanging device when the temperature of the heating medium to be supplied to said heat exchanging device is higher than a predetermined temperature for starting supplying the heating medium and the flow rate of the heating medium to be supplied to said heat exchanging device is increased to such an extent that the rate of increase with time in the supply energy does not exceed the predetermined value as the temperature of the heating medium rises.

7. The method according to claim 6, wherein:
   said heating medium supply system comprises the heating medium supply system wherein said heat exchanging device comprises a preheating section for preheating feedwater, an evaporating section for evaporating feedwater preheated, and a superheating section for heating steam generated by said evaporating section to obtain superheated steam, the evaporating section being provided with a pressure detecting device for detecting a pressure of generated steam;
   in the step of estimating a saturation temperature of steam, said control device estimates the saturation temperature of steam within said evaporating section from a steam pressure as a result of detection by said pressure detecting device provided in said evaporating section of said heat exchanging device;
   in the step of controlling the flow rate of the heating medium, the temperature of the heating medium is detected by said first heating medium temperature detecting device and the temperature for starting supplying the heating medium is the sum of the saturation temperature of steam and a predetermined excess temperature; and said control device controls the operation of said first heating medium flow rate controlling device so as to start supplying the heating medium to said heat exchanging device and increase the flow rate of the heating medium.

8. The method according to claim 5, wherein:

said heating medium supply system comprises a heating medium supply system further including a bypass passage provided to said heating medium supply passage for circulating the heating medium to said heating system by bypassing said heat exchanging device, a second heating medium flow rate controlling device provided on said bypass passage, and a second heating medium temperature detecting device provided on said heating medium supply passage at a location adjacent an inlet of said heating system; and said control device controls said second heating medium flow rate controlling device in such a manner as to cause at least a part of the heating medium outgoing from said heating system to pass through said bypass passage and join with the heating medium to be returned to said heating system so that the temperature of the heating medium to be returned to said heating system as a result of detection by said second heating medium temperature detecting device does not fall below a predetermined temperature.

* * * * *

UNITED STATES PATENT AND TRADEMARK OFFICE
CERTIFICATE OF CORRECTION

PATENT NO. : 8,701,411 B2
APPLICATION NO. : 12/514300
DATED : April 22, 2014
INVENTOR(S) : Koketsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this
Twenty-ninth Day of September, 2015

Michelle K. Lee
*Director of the United States Patent and Trademark Office*